US012045733B2

United States Patent
Ambati et al.

(10) Patent No.: US 12,045,733 B2
(45) Date of Patent: Jul. 23, 2024

(54) TIME-BASED ENSEMBLE MACHINE LEARNING MODEL

(71) Applicant: H2O.ai Inc., Mountain View, CA (US)

(72) Inventors: SriSatish Ambati, Palo Alto, CA (US); Ashrith Barthur, San Francisco, CA (US)

(73) Assignee: H2O.ai Inc., Mountain View, CA (US)

( * ) Notice: Subject to any disclaimer, the term of this patent is extended or adjusted under 35 U.S.C. 154(b) by 0 days.

(21) Appl. No.: 17/859,684

(22) Filed: Jul. 7, 2022

(65) Prior Publication Data

US 2023/0177352 A1 Jun. 8, 2023

Related U.S. Application Data

(63) Continuation of application No. 15/937,648, filed on Mar. 27, 2018, now Pat. No. 11,416,751.

(60) Provisional application No. 62/479,963, filed on Mar. 31, 2017.

(51) Int. Cl.
  *G06N 5/02* (2023.01)
  *G06N 20/00* (2019.01)
  *G06N 20/20* (2019.01)

(52) U.S. Cl.
  CPC ............ *G06N 5/02* (2013.01); *G06N 20/00* (2019.01); *G06N 20/20* (2019.01)

(58) Field of Classification Search
  CPC ........... G06N 5/02; G06N 20/20; G06N 20/00
  See application file for complete search history.

(56) References Cited

U.S. PATENT DOCUMENTS

| 8,554,703 | B1 | 10/2013 | Lin |
| 9,516,053 | B1 | 12/2016 | Muddu |
| 9,542,646 | B1 | 1/2017 | Baughman |

(Continued)

FOREIGN PATENT DOCUMENTS

| CN | 102681868 | 9/2012 |
| CN | 104956359 | 9/2015 |

(Continued)

OTHER PUBLICATIONS

Wang, Shuo, Leandro L. Minku, and Xin Yao. "Resampling-based ensemble methods for online class imbalance learning." IEEE Transactions on Knowledge and Data Engineering 27.5 (2014): 1356-1368. (Year: 2014).*

(Continued)

*Primary Examiner* — Kevin W Figueroa
(74) *Attorney, Agent, or Firm* — Van Pelt, Yi & James LLP

(57) ABSTRACT

An input dataset is sorted into a first version of data and a second version of data. The first version of data is associated with a first period of time and the second version of data is associated with a second period of time. The second period of time is a shorter period of time than the first period of time. A first set of one or more machine learning models is generated based on the first version of data. A second set of one or more machine learning models is generated based on the second version of data. The first set of one or more machine learning models and the second set of one or more machine learning models are combined to generate an ensemble model. A prediction based on the ensemble model is outputted. The prediction indicates abnormal behavior associated with the input dataset.

19 Claims, 7 Drawing Sheets

(56) References Cited

U.S. PATENT DOCUMENTS

| | | | | |
|---|---|---|---|---|
| 2016/0283861 A1* | 9/2016 | Gerard | ............ | G06N 5/04 |
| 2016/0299938 A1 | 10/2016 | Malhotra | | |
| 2016/0358099 A1* | 12/2016 | Sturlaugson | ........ | G06N 5/043 |
| 2017/0063886 A1 | 3/2017 | Muddu | | |
| 2018/0197087 A1* | 7/2018 | Luo | ............ | G06F 16/285 |

FOREIGN PATENT DOCUMENTS

| | | |
|---|---|---|
| CN | 105046327 | 11/2015 |
| CN | 104520806 | 9/2016 |
| CN | 106250986 | 12/2016 |
| CN | 106548210 | 3/2017 |
| CN | 104794192 | 6/2018 |
| JP | 2016099738 | 5/2016 |

OTHER PUBLICATIONS

Bi et al. "Resampling methods and machine learning." Chinese Journal of Computers 32.5 (2009): 862-877.

Wang et al., "Resampling-based ensemble methods for online class imbalance learning." IEEE Transactions on Knowledge and Data Engineering 27.5 (2014): 1356-1368. (Year: 2014).

* cited by examiner

TIME-BASED ENSEMBLE MACHINE LEARNING MODEL

CROSS REFERENCE TO OTHER APPLICATIONS

This application is a continuation of U.S. patent application Ser. No. 15/937,648, entitled TIME-BASED ENSEMBLE MACHINE LEARNING MODEL filed Mar. 27, 2018 which is incorporated herein by reference for all purposes, which is claims priority to U.S. Provisional Patent Application No. 62/479,963 entitled DETECTING MONEY LAUNDERING USING MACHINE LEARNING filed Mar. 31, 2017 which is incorporated herein by reference for all purposes.

BACKGROUND OF THE INVENTION

Machine learning is a field of computer science that gives computers the ability to learn without being explicitly programmed. A computer may include a machine learning model that can be trained to implement a complex function that is configured to generate one or more predictions based on a set of inputs. The trained machine learning model is configured to act like a black box: it receives production data, the production data is applied to the complex function, and one or more prediction labels are outputted.

BRIEF DESCRIPTION OF THE DRAWINGS

Various embodiments of the invention are disclosed in the following detailed description and the accompanying drawings.

DETAILED DESCRIPTION

Figure 1:
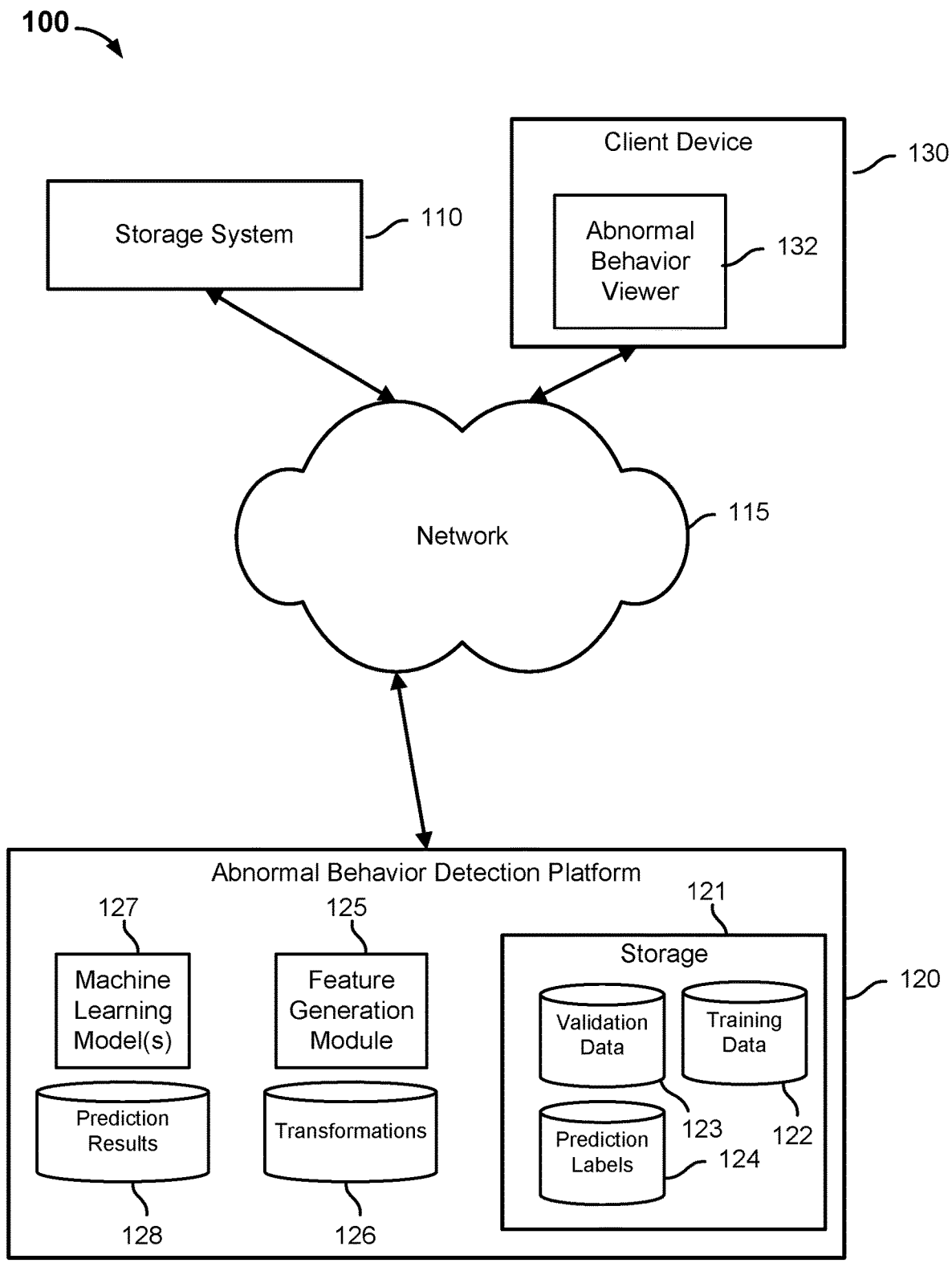
FIG. 1 is a block diagram illustrating an embodiment of a system for detecting abnormal behavior.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A computing device may be configured to implement a machine learning model. The machine learning model may be trained to output a prediction based on a set of input data. The set of input data is comprised of a plurality of entries. Each entry is associated with a plurality of features having corresponding feature values. Each entry may be associated with a corresponding prediction label. The set of input data may be sorted into training data and validation data. Training data may be used to train a machine learning model. The machine learning model may be tuned to better match the prediction labels associated with the training data. For example, one or more weights associated with the one or more features included in the machine learning model may be tuned to improve the accuracy of the machine learning model. Validation data included in the set of input data may be used to validate the trained machine learning model. Subsequently, production data may be applied to the validated machine learning model. In response to the production data, the machine learning model is configured to output a prediction label associated with the production data. However, the accuracy of the prediction label is limited based on one or more factors.

First, the accuracy of the prediction label is limited based on the training data that was used to train the machine learning model. Training data may be an accumulation of data over a period of time (e.g., one year). The machine learning model may be trained on the entire dataset. Abnormal feature values associated with a feature may blend in with the other training data and be overlooked. The abnormality would be captured, but because this abnormality does not last for long, it would not be a significant event (e.g., the weights of a model are based on the significance given to a particular event). For example, a feature may have volatile feature values for a short period of time (e.g., one day) and the abnormal features values may not be identified when the machine learning model is trained.

Second, a frequency at which the machine learning model is retrained may limit the accuracy of the machine learning model. Conventional machine learning models are retrained on a periodic basis (e.g., monthly). However, such an approach does not account for volatility in the production data. For example, a feature and its corresponding feature value may not be given a significant amount of weight in a machine learning model prediction. However, in the production data, the feature value associated with the feature may exhibit significant volatility since the last time the machine learning model was trained/retrained. This feature volatility may influence a prediction label. A machine learning model may not account for this feature volatility until it is retrained, which may result in a less accurate machine learning model in the interim period.

Lastly, the accuracy of the machine learning model depends on the features that were used to train the machine learning model. A training dataset may be comprised of a plurality of entries having a plurality of features and corresponding feature values. The machine learning model may be trained using a subset of the features. As a result, the accuracy of the machine learning model is based on the subset of features. However, after the machine learning model is trained, a feature not included in the subset of features may exhibit volatility influence the prediction for which the machine learning model is trained to predict. The machine learning model would be unable to determine the influence of the feature in its prediction unless it is retrained.

As a result, the machine learning model may output a false positive prediction instead of a true positive prediction. A machine learning model that outputs too many false positive predictions is ineffective.

A time-based ensemble machine learning model is disclosed. The time-based ensemble machine learning model reduces the number of false positive predictions and increases the number of true positive predictions. The time-based ensemble machine learning model is configured to output a prediction label that indicates whether an entry is indicative of abnormal behavior. The prediction label may indicate a probability that the entry is associated with abnormal behavior.

A set of input data is received on a periodic basis (e.g., daily). The set of input data is comprised of a plurality of entries. Each entry is associated with a plurality of features having corresponding feature values. Each entry may be associated with a corresponding prediction label. The prediction label may indicate whether an entry is associated with abnormal behavior. The prediction label may indicate a probability that the entry is associated with abnormal behavior. The prediction label may indicate that the entry is associated with abnormal behavior (e.g., yes/no, 0/1). Each set of input data may be associated with a particular time period (e.g., hour, day, week, etc.). For example, a timestamp may be assigned to a set of input data. A plurality of input datasets may be accumulated over a period of time to generate an accumulated dataset. The accumulated dataset may be sorted based on different time periods to generate one or more new datasets (e.g., a training and validation dataset). A time period may be a previous time period (e.g., last hour, last day, last week, last month, last six months, last year, etc.) or a specific time period (e.g., 1/1/2018, 1/1/2018-1/14/2018, 9:00 am EST 1/1/2018-10:00 am EST 1/1/2018, etc.).

The accumulated dataset may be sorted into multiple versions of training and validation data based on different time periods. For example, a first version of training and validation data may correspond to input data associated with the last six months. A second version of training and validation data may correspond to input data associated with the last two weeks. A version of training and validation data is comprised of a plurality of entries having corresponding features, feature values, and/or prediction labels.

Each version of training and validation data may be used to train/validate one or more machine learning models. A machine learning model may be generated using a machine learning algorithm, such as decision trees, naïve bayes classification, least squares regression, logistic regression, support vector machines, neural networks, deep learning, gradient boosting machine, generalized linear model, mathematical average, etc. A machine learning model is trained using a set of features and corresponding feature values.

A machine learning model may be tuned to better match the prediction labels associated with the training data. For example, one or more weights associated with the one or more features included in the machine learning model may be tuned to improve the accuracy of the machine learning model.

Validation data included in the version of training and validation data may be used to validate a trained machine learning model. The validation data may verify the accuracy of the trained machine learning model. A machine learning model may undergo one or more iterations of training/validation until a threshold validation score (e.g., accuracy) is reached.

The one or more validated machine learning models that are associated with a version of training and validation data may be combined to form an ensemble model. The ensemble model is configured to output one or more prediction labels that is based on the output of the one or more machine learning models. A prediction label may indicate a probability that one or more entries are associated with abnormal behavior. A weight may be assigned to each machine learning model included in the ensemble model. The weight associated with a machine learning model included in the ensemble may be tuned to reflect the degree of influence that the machine learning model has over the ensemble model prediction.

The ensemble model associated with a first version of training and validation data may be combined with one or more ensemble models associated with one or more other versions of training and validation data to create a combined ensemble model. The combined ensemble model is configured to output one or more prediction labels that is based on the output of the one or more ensemble models that are combined to form the combined ensemble model. A weight may be assigned to each ensemble model included in the combined ensemble model. The weight associated with an ensemble model included in the combined ensemble model may be tuned to reflect the degree of influence that an ensemble model has over the combined ensemble model prediction.

A computing device that implements a combined ensemble model prediction may output a more accurate prediction than a computing device that implements a conventional machine learning model because the combined ensemble model prediction takes into consideration feature values that may not appear to be volatile in the long term, but appear to be volatile in the short term. As a result, abnormal behavior may be more correctly identified.

A production dataset may be applied to the combined ensemble model. The production dataset includes one or more entries. The one or more entries of the production dataset do not include a corresponding prediction label. The combined ensemble model is configured to output a prediction label for each of the one or more entries. In some embodiments, the combined ensemble model is configured to indicate that a single entry is indicative of abnormal behavior. In other embodiments, the combined ensemble model is configured to indicate a subset of the production dataset is indicative of abnormal behavior. The one or more entries that are indicative of abnormal behavior are identified (e.g., flagged) and a notification is provided to a reviewer system to review the identified one or more entries. A user of the reviewer system may indicate that an entry identified as being associated with abnormal behavior is a true positive or a false positive. A true positive is an entry that was identified as being indicative of abnormal behavior and is indicative of abnormal behavior. A false positive is an entry that was identified as being indicative of abnormal behavior and is not indicative of abnormal behavior. The combined ensemble model may result in less false positives that conventional machine learning models. This is an improvement over conventional machine learning models because the purpose of a computing device implementing a machine learning model is to provide as accurate of a prediction as possible.

The one or more machine learning models associated with the combined ensemble model may be retrained to improve the accuracy of its predictions.

In some embodiments, an input dataset is received from a data source on a periodic basis (e.g., hourly, daily, weekly, etc.). The input dataset is comprised of a plurality of entries. Each entry is associated with a plurality of features and corresponding feature values. The input dataset may be merged with one or more previous sets of input data. A corresponding statistical baseline value associated with each feature (e.g., average, median, range, etc.) may be determined for a first time period. The first time period may be a previous time period (e.g., last month, last 3 months, last 6 months, last year, etc.) or a specific time period (2017, June 2017, etc.). A corresponding statistical volatility value associated with each feature (e.g., average, median, range, etc.) may be determined for a second time period. The second time period may be a previous time period (e.g., last hour, last day, last week, last 2 weeks, etc.) or a specific time period (1/1/2017, 1/1/2017-1/14/2017, etc.). The second time period is a shorter time period than the first time period. For example, the first time period may correspond to the last six months and the second time period may correspond to the last week.

The statistical baseline value of a feature is compared to the statistical volatility value of the feature to determine a variance of the feature. In the event the statistical volatility value does not satisfy a trigger event (e.g., less than a threshold amount) when compared to the statistical baseline value, the one or more machine learning models associated with the combined ensemble model are retained. In the event the statistical volatility value satisfies a trigger condition (e.g., greater than or equal to a threshold amount) when compared to the statistical baseline value, at least one of the one or more machine learning models of the combined ensemble model is retrained. For example, the statistical baseline value of a feature may be the median value of the feature for the last 6 months and the statistical volatility value of the feature may be the average value of the feature for the last 2 weeks. In the event the statistical volatility value of the feature varies from the statistical baseline value of a feature more than a threshold amount (e.g., one standard deviation), a machine learning model may be retrained. In the event a machine learning model was not trained using the volatile feature, the machine learning model may be retrained based at least in part on the volatile feature. In the event a machine learning model was trained using the volatile feature, the machine learning model may be retrained such that a weight associated with the volatile feature is tuned to take the volatility into account.

In some embodiments, a subset of the prediction labels are sampled and reviewed. For example, a machine learning model may be configured to make 100 predications and 10 of the predictions are sampled. An indication that indicates whether a prediction is a false positive or a true positive is received. In the event the number of false positives satisfies a trigger event (e.g, is below a false positive threshold), the machine learning model is retained. Otherwise, the machine learning model is retrained or redesigned. Alternatively, in the event the number of true positives satisfies a trigger event (e.g., less than a threshold number of true positives), the machine learning model is retrained or redesigned.

Retraining one or more machine learning models associated with the combined ensemble model based on feature volatility and/or a number of false/true positive predictions improves the accuracy of the one or more machine learning models and the combined ensemble model because a machine learning model of the combined ensemble model would continue to make less accurate predictions until it is retrained. Such an inaccuracy would be propagated to the combined ensemble model, which will result in a reduce accuracy in the overall prediction.

Retraining one or more machine learning models associated with the combined ensemble model based on feature volatility and/or a number of false/true positive predictions may also prevent computing resources from being wasted by retraining the machine learning model because retraining a machine learning model on a periodic schedule may cause the machine learning model to be retrained when it is not necessary. A feature value-driven and/or true/false positive-driven approach will ensure that the one or more machine learning models of the combined ensemble model are retrained only when they need to be retrained.

FIG. 1 is a block diagram illustrating an embodiment of a system for detecting abnormal behavior. In the example shown, the system 100 includes a storage system 100, a network 115, an abnormal activity detection platform 120, and a client device 130.

Storage system 110 is configured to store data associated with a plurality of entities. An entity may be, for example, a person, a bank, a business, a hospital, a government agency, a machine, a device, an airline, etc. Storage system 110 may be comprised of one or more servers, one or more computing devices, one or more storage devices, and/or a combination thereof.

In some embodiments, the data includes personal information associated with an entity, such as name, address, age, sex, date of birth, height, weight, blood type, hair color, eye color, occupation, current employer, previous employer(s), social security number, etc.

In some embodiments, the data includes transaction information associated with an entity. Transaction information may include, for example, account type, account balance, a date when a particular account was open, owner of account, an amount associated with a deposit or withdrawal, a time stamp of a withdrawal associated with the particular account, a timestamp of a deposit associated with the particular account, a type of deposit method for a particular deposit (e.g., ATM deposit, wire transfer, teller deposit, mobile application etc.), a type of withdrawal method for a particular account (e.g., ATM withdrawal, wire transfer, teller withdrawal, mobile application, etc.) accounts associated with a deposit (e.g., money deposited from account A into account B), and/or accounts associated with a withdrawal (e.g., money withdrawn from account B and deposited into account A).

In some embodiments, the data includes sensor data associated with an entity. For example, the sensor data may include a temperature sensor value, a proximity sensor value, an inductive sensor value, a capacitance value, a photoelectric value, an ultrasonic sensor value, an acceleration sensor value, a brightness sensor value, a pressure sensor value, a force value, a water quality value, a conductivity sensor value, a turbidity sensor value, a total organic carbon sensor value, a chlorine residual sensor value, a pH sensor value, a chemical sensor value, a gas sensor value, a carbon dioxide sensor value, a breathalyzer value, a carbon monoxide sensor value, a catalytic bead sensor value, a hydrogen sensor value, an air pollution sensor value, a nitrogen oxide sensor value, an oxygen sensor value, an ozone monitor value, an electrochemical gas sensor value, a hygrometer value, a smoke sensor value, an infrared sensor value, an image sensor, a motion detector sensor, a gyroscope sensor value, a humidity sensor value, an optical sensor value, etc.

In some embodiments, the data associated with an entity includes a prediction label. The prediction label may indicate when an entry associated the data is associated with abnormal behavior. For example, a sensor value may indicate that the sensor is not working properly and a particular sensor reading may have been flagged as abnormal behavior. One or more particular transaction activities associated with a person may have been flagged being indicative of abnormal behavior and associated with money laundering.

Storage system 110 is coupled to abnormal behavior detection platform 120 via network 115. Network 115 comprises one or more of the following: a local area network, a wide area network, a wired network, a wireless network, the Internet, an intranet, or any other appropriate communication network.

Abnormal behavior detection platform 120 includes storage 121, a feature generation module 125, a plurality of transformations 126, one or more machine learning models 127, and prediction results 128.

Abnormal behavior detection platform 120 is configured to receive a set of input data from storage system 110 and store the input data in storage 121. Storage 121 may be comprised of one or more solid state drives, one or more hard disk drives, cloud storage, or a combination thereof. Abnormal behavior detection platform 120 may include one or more processors coupled to the storage drives and configured to store input data in storage 121.

The set of input data includes data associated with one or more entities. The set of input data is received on a periodic basis (e.g., daily). The set of input data is comprised of a plurality of entries. Each entry is associated with a plurality of features having corresponding feature values. Each entry may be associated with a corresponding prediction label. The prediction label may indicate whether an entry is associated with abnormal behavior. The prediction label may indicate a probability that the entry is associated with abnormal behavior. The prediction label may indicate that the entry is associated with abnormal behavior. The prediction labels may be stored as prediction labels 124. Each set of input data may be associated with a particular time period (e.g., hour, day, week, etc.). For example, a timestamp may be assigned to a set of input data. A plurality of input datasets may be received from storage system 110 and accumulated over a period of time to generate an accumulated dataset. The accumulated dataset may be sorted based on different time periods to generate one or more new datasets. A time period may be a previous time period (e.g., last hour, last day, last week, last month, last six months, last year, etc.) or a specific time period (e.g., 1/1/2018, 1/1/2018-1/14/2018, 9:00 am EST 1/1/2018-10:00 am EST 1/1/2018, etc.).

The accumulated dataset may be sorted into training and validation data. In some embodiments, a number of entries that are used as training data is greater than the number of entries that are used as validation data. In other embodiments, the number of entries that are used as training data is equal to the number of entries that are used as validation data. In other embodiments, the number of entries that are used as validation data is greater than the number of entries that are used as training data.

The accumulated dataset may be sorted into multiple versions of training and validation data based on different time periods and stored as training data 122 and validation data 123, respectively. For example, a first version of training and validation data may correspond to input data associated with the last six months. A second version of training and validation data may correspond to input data associated with the last two weeks. A version of training and validation data is comprised of a plurality of entries having corresponding features, feature values, and/or prediction labels. Each version of training and validation data may be used to train/validate at least one of the machine learning models 127.

A feature generation module 125 is configured to generate one or more new features based on the features included in the input dataset received from storage system 110. Feature generation module 125 may select a transformation from transformations 126 and apply the selected transformation to one or more features and their corresponding feature values. In some embodiments, a feature undergoes a transformation to generate a new feature. In other embodiments, a plurality of features undergo a transformation to generate a new feature. The transformers may include a filter transformer, a frequent transformer, a bulk interactions transformer, a truncated SVD numeric transformer, a cross validation target encoding, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer.

The filter transformer counts each numeric value in the dataset. The frequent transformer counts each categorical value in the dataset. This count can be either the raw count or the normalized count. The bulk interactions transformer will add, divide, multiply, and/or subtract two columns in the feature dataset. The truncated singular value decomposition (SVD) numeric transformer trains on a selected numeric columns in the dataset. The components of the truncated SVD will be new features. The cross validation target encoding is done on a categorical column. The cross validation categorical to numeric encode transformer converts a categorical column to a numeric column. Cross validation encoding is done on the categorical column. The dates transformer retrieves any data values (e.g., year, quarter, month, day, day of year, week, week day, hour, minute, second, etc.) into a numeric value. The date polar transformer expands the date using polar coordinates. The date transformer will only expand the date into different units, for example month. This does not capture the similarity between the months December and January (12 and 1) or the hours 23 and 0. The polar coordinates capture the similarity between these cases by representing the unit of the data as a point in a cycle. The text transformer transforms a text column using TFIDF (term frequency-inverse document frequency) or count (count of the word). This may be followed by dimensionality reduction using truncated SVD. The categorical target encoding transformer may perform cross validation target encoding on a categorical column. The numeric to categorical target encoding transformer converts a numeric column to categorical by binning. Cross validation target encoding is done on the binned numeric column. The cluster target encoding transformer clusters selected columns in the data and target encoding is done on the cluster ID. The cluster distance transformer clusters selected columns in the data and the distance to a chosen cluster center is calculated. A weight of evidence creates likelihood type of features using the weights of evidence (WOE) transformation method. The weight of evidence tells the predictive power of an independent variable in relation to the dependent variable.

In some embodiments, the one or more new features generated by feature generation module 125 may include a total amount (withdrawals−deposits) for a specified duration (e.g., the last 7 days), a number of cash deposits for a specified duration (e.g., the last 30 days), a volume of cash deposits for a specified duration (e.g., the last 30 days), a volume of withdrawals for a specified duration (e.g., the last 30 days), a number of withdrawals for a specified duration (e.g., the last 30 days), a total amount of money withdrawn from non-ATM sources for a specified duration (e.g., the last 30 days), a volume of money withdrawn via a ATM divided by the total volume of money withdrawn for a specified duration (e.g., the last 30 days), a total amount of money withdrawn from a non-ATM source for a specified duration, a volume of money withdrawn via a ATM divided by the volume of money withdrawn by non-ATM withdrawal mechanisms, an age of an account, an average amount (withdrawals−deposits) per duration (e.g., per day) for a specified duration (e.g., last 30 days), the average size of withdrawals for a specified duration (e.g., last 7 days), a weekly total amount for a specified duration, the amount of money withdrawn less the amount of money deposited on a first duration basis (e.g., per week basis) for a specified period (e.g., six months), and/or a volume of money withdrawn via a ATM for a specified duration divided by a total volume of money for the specified duration on a per monthly basis.

The one or more new features may be generated based on transaction data. In some embodiments, the one or more new features are generated from the transaction data associated with a plurality of entities. In other embodiments, the features are generated from the transaction data associated with a particular entity account. In other embodiments, some of the features are generated from the data associated with a first entity and other features are generated from the data associated with one or more other entities.

One or more machine learning models 127 may be generated using a machine learning algorithm, such as decision trees, naïve bayes classification, least squares regression, logistic regression, support vector machines, neural networks, deep learning, gradient boosting machine, generalized linear model, mathematical average, etc. The one or more machine learning models 127 may be configured to output a prediction label indicating whether one or more entries of the input data are indicative of abnormal behavior (e.g., money laundering, faulty sensor, etc.). The output may include one or more reason codes that explain why a particular entry was labeled as being abnormal. The reason codes indicate specific features and a corresponding weight associated with the feature. For example, in a tree model, the reason code values are values that split a tree into leaves or branches and are used to explain the decision process as to why a certain entry was flagged as being abnormal.

A machine learning model is trained using a set of features and corresponding feature values. In some embodiments, the set of features includes a subset of the features included in the training data. In some embodiments, the set of features includes one or more new features that are based on the one or more features included in the training data. The one or more new features may be generated by feature generation module 125. The set of features used to train a first machine learning model may overlap with all, some, or none of the features associated with the set of features used to train a second machine learning model. A machine learning model may be trained using the same set of features as another machine learning model, but use a different machine learning algorithm. A machine learning model may be trained using the same machine learning algorithm as a different machine learning model, but trained using a different set of features.

Feature importance may be used to determine which features to select and use to train a machine learning model. The feature importance may be a popularity measure of a feature. For a tree based model, the more number of times a feature is used to split data, the more important the feature is. In a deep learning model, the weights of each neuron is calculated and then the weights for all the neurons for a certain hidden layer are normalized and then that provides the weight of a certain feature or a neuron (e.g., Gedeon method). The number of times a feature is used is visible in ensemble machine learning approaches, such as Random Forest or Gradient Boosted Machines. A certain is used more, for every tree (in an ensemble method), if this feature amongst all or a chosen set of features produces the highest accuracy.

A machine learning model may be tuned to better match the prediction labels associated with the training data. For example, the predicted label associated with an entry determined by one of the machine learning models 127 may be compared to the prediction label associated with the entry that is included in the input data. The machine learning model may be retrained based on the comparison, for example, to fine tune the machine learning model to make a more accurate prediction. In some embodiments, one or more weights associated with the machine learning model are tuned to improve the accuracy of the machine learning model. For example, one or more weights associated with the one or more features included in the machine learning model may be tuned to improve the accuracy of the machine learning model.

Validation data included in the version of training and validation data may be used to validate a trained machine learning model. The validation data is comprised of a plurality of entries associated with a plurality of features and corresponding feature values. The validation data may verify the accuracy of the trained machine learning model. A machine learning model may undergo one or more iterations of training/validation until a threshold validation score (e.g., accuracy) is reached.

A validation score of a machine learning model may be determined by computing the difference between the predicted feature label and the actual feature value for an entry. The validation score of the machine learning model for an entry (e.g. accuracy for the entry) may be determined as:

$$\text{Validation Score} = \left(1 - \frac{\text{Predicted Value} - \text{Actual Value}}{\text{Actual Value}}\right) \times 100 \quad (1)$$

The overall validation score of the machine learning model for all the entries (e.g., overall accuracy) may be determined as:

$$\text{Overall Validation Score} = \frac{\sum \text{Validation Score for each Entry}}{\# \text{ of Entries}} \quad (2)$$

The overall validation score may be compared to the threshold validation score. In the event the overall validation score is greater than or equal to the threshold validation score, the machine learning model is retained. In the event the overall validation score is less than the threshold validation score, the machine learning model is retrained.

The one or more validated machine learning models that are associated with a version of training and validation data may be combined to form an ensemble model. The ensemble model is configured to output a prediction label that is based on the output of the one or more machine learning models. A weight may be assigned to each machine learning model included in the ensemble model. The weight associated with a machine learning model included in the ensemble may be tuned to reflect the degree of influence that the machine learning model has over the ensemble model prediction.

The ensemble model associated with a first version of training and validation data may be combined with one or more ensemble models associated with one or more other versions of training and validation data to create a combined ensemble model. The combined ensemble model is configured to output a prediction label that is based on the output of the one or more version ensemble models. A weight may be assigned to each ensemble model included in the combined ensemble model. The weight associated with an ensemble model included in the combined ensemble model may be tuned to reflect the degree of influence that an ensemble model should has over the combined ensemble model prediction.

A production dataset may be received from storage system 110 or client device 130. The production dataset includes one or more entries that associated with a plurality of features having corresponding feature values. The one or more entries included in the production dataset do not include corresponding predictions labels. The one or more machine learning models 127, the one or more ensemble models, and the combine ensemble model are configured to output one or more prediction labels based on the production data. The prediction label may indicate that one or more entries of the production data are associated with abnormal behavior (e.g., money laundering, faulty sensor, malfunctioning device, etc.). The prediction label may have one or more corresponding reason codes. Abnormal behavior detection platform 120 is configured to provide the one or more prediction labels to client device 130 via network 115. In some embodiments, the one or more corresponding reason codes are provided with the one or more prediction labels.

Client device 130 may be a personal computer, a laptop computer, a personal digital assistant, a server, a mobile phone, a tablet, etc. Client device 130 may be associated with an entity (e.g., a person, a bank, a business, a hospital, a government agency, a machine, a device, an airline, etc.).

Client device 130 includes an abnormal behavior viewer 132. Abnormal behavior viewer 132 may be an application associated with abnormal behavior detection platform 120 or a browser connected to abnormal behavior detection platform 120. Abnormal behavior viewer 132 may provide a list of alerts. The list of alerts may include one or more entries and their corresponding prediction labels. The alerts can include true positive (TP) and false positive (FP) alerts. A user of abnormal behavior viewer 132 may indicate whether an alert is a true positive or a false positive. The user feedback may be provided to abnormal behavior detection platform 120 to retrain the one or more machine learning models 127.

Figure 2:
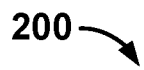
FIG. 2 is a diagram illustrating an embodiment of an input dataset.

FIG. 2 is a block diagram illustrating an embodiment of an input dataset. Input dataset 200 may be stored by storage system, such as storage system 110. Input dataset 200 may be implemented by an abnormal behavior detection platform, such as abnormal behavior detection platform 120. Input dataset 200 may be used to generate a machine learning model that is configured to predict whether an entry is associated with abnormal behavior. In some embodiments, input dataset 200 may be sorted into training data and validation data. In some embodiments, input dataset 200 is training data. In other embodiments, input dataset 200 is validation data.

In the example shown, input dataset 200 includes entries $A_1, A_2 \ldots A_n$. Each entry is comprised of one or more features having a corresponding feature value. For example, entry $A_1$ is comprised of features $F_1, F_2 \ldots F_n$ that have corresponding feature values of $X_1, Y_1 \ldots Z_1$. Entry $A_2$ is comprised of features $F_1, F_2 \ldots F_n$ that have corresponding feature values of $X_2, Y_2 \ldots Z_2$. Entry $A_n$ is comprised of features $F_1, F_2 \ldots F_n$ that have corresponding feature values of $X_n, Y_n \ldots Z_n$. In some embodiments, a feature value may correspond to the actual value of a feature (e.g., temperature=98°). In other embodiments, a feature value may correspond to one of the ranges of values (e.g., a value of "2" indicates a bank account balance of $100K-$200K). In other embodiments, a feature value may correspond to one of the possible non-numerical values (e.g, "0"=male, "1"=female). In other embodiments, the feature value may be a text string (e.g., "red," "yellow").

Each entry may have a corresponding prediction label. For example, entries $A_1, A_2 \ldots A_n$ may have a corresponding prediction label of $P_1, P_2 \ldots P_n$, respectively. The prediction label may indicate whether a corresponding entry is indicative of abnormal behavior. The prediction label may indicate a probability that a corresponding entry is indicative of abnormal behavior.

The set of features $X_1, Y_1 \ldots Z_1$ may be filtered to include a set of representative features (i.e., a subset of the initial set of features). A machine learning model may be trained using one or more entries and their corresponding representative features.

Input dataset 200 may correspond to training data. A machine learning model may be trained to output a prediction that matches the prediction labels associated with the entries. The machine learning model may be retrained based on the comparison, for example, to fine tune the machine learning model to make a prediction that is closer to the prediction label. In some embodiments, one or more weights associated with the machine learning model are tuned to improve the accuracy of the machine learning model. For example, one or more weights associated with the one or more features included in the machine learning model may be tuned to improve the accuracy of the machine learning model.

Input dataset 200 may correspond to validation data. A trained machine learning model may be validated to see if its corresponding prediction label matches a predication label included in the input dataset. A machine learning machine may be validated in the event a validation score associated with its predication labels is greater than or equal to a validation score threshold. Otherwise, the machine learning model is retrained.

Figure 3:
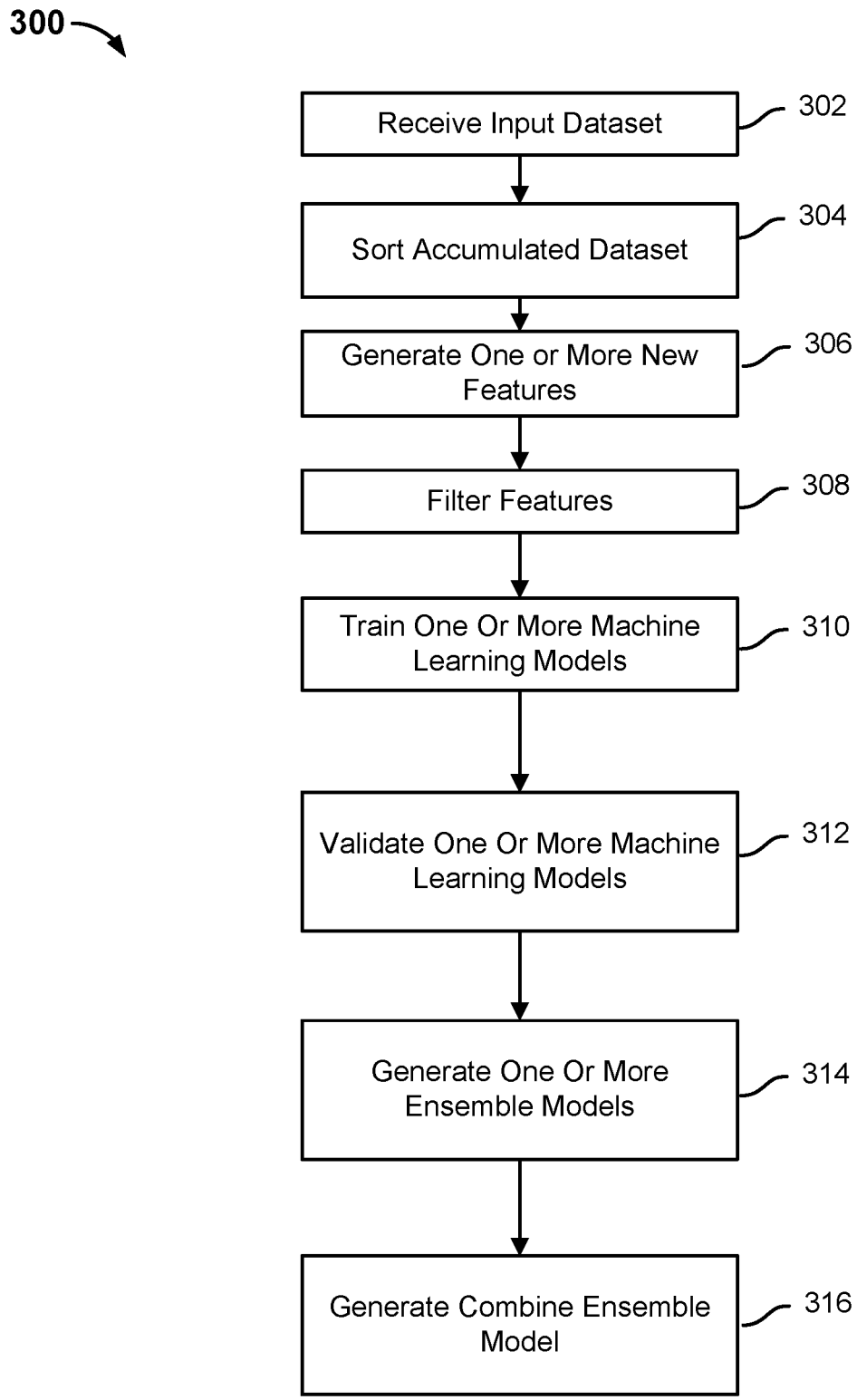
FIG. 3 is a flow chart illustrating an embodiment of a process for training machine learning models to detect abnormal behavior.

FIG. 3 is a flow chart illustrating an embodiment of a process for training machine learning models to detect abnormal behavior. Process 300 may be implemented by an abnormal behavior detection platform, such as abnormal behavior detection platform 120.

At 302, an input dataset is received. The set of input data is comprised of a plurality of entries. Each entry is associated with a plurality of features having corresponding feature values. Each entry may be associated with a corresponding prediction label. The prediction label may indicate whether an entry is associated with abnormal behavior. Each set of input data may be associated with a particular time period (e.g., hour, day, week, etc.). For example, a timestamp may be assigned to a set of input data. A plurality of input datasets may be accumulated over a period of time to generate an accumulated dataset.

The input dataset may be received from a plurality of sources. For example, personal information associated with an entity may be received from a first source and transactional information associated with the entity may be received from a second source. The input data received from a plurality of sources may be merged to generate a single dataset.

At 304, the accumulated dataset is sorted. The accumulated dataset may be sorted based on different time periods to generate one or more new datasets. A time period may be a previous time period (e.g., last hour, last day, last week, last month, last six months, last year, etc.) or a specific time period (e.g., 1/1/2018, 1/1/2018-1/14/2018, 9:00 am EST 1/1/2018-10:00 am EST 1/1/2018, etc.). The accumulated dataset may be sorted into multiple versions of training and validation data based on different time periods. For example, a first version of training and validation data may correspond to input data associated with the last six months. A second version of training and validation data may correspond to input data associated with the last two weeks. A version of training and validation data is comprised of a plurality of entries having corresponding features, feature values, and/or prediction labels.

At 306, one or more new features are generated. The one or more new features may be generated based on the features included in the input dataset. A transformation may be selected and applied to one or more features of the input dataset and their corresponding feature values. In some embodiments, a feature undergoes a transformation to generate a new feature. In other embodiments, a plurality of features undergo a transformation to generate a new feature.

At 308, one or more features are filtered. The one or more features includes original features included in the input dataset and/or one or more new features. A distribution of feature values associated with a feature is determined. It is determined whether the distribution of feature values associated with a feature satisfies a threshold variation. In the event the feature values associated with the feature satisfy the threshold variation, the feature is retained and included in the subset of training features. In the event the feature values associated with the feature do not satisfy the threshold variation, the feature is not included in the subset of training features. In some embodiments, the distribution of feature values is monotonic.

At 310, one or more machine learning models are trained using the subset of training features. In some embodiments, the subset of training features includes a subset of the original features included in the input data set. In some embodiments, the subset of training features includes a subset of the original features included in the input data set and one or more new features.

The one or more machine learning models are trained using training data associated with one of the versions of training and validation data. For example, a first machine learning model may be trained using training data associated with a first version of training and validation data and a second machine learning model may be trained using training data associated with a second version of training and validation data. The first version of training and validation data and second version of training and validation data correspond to different time periods.

A machine learning model may be generated using a machine learning algorithm, such as decision trees, naïve bayes classification, least squares regression, logistic regression, support vector machines, neural networks, deep learning, gradient boosting machine, generalized linear model, mathematical average, etc. A machine learning model may be trained using the same set of features as another machine learning model, but use a different machine learning algorithm. A machine learning model may be trained using the same machine learning algorithm as a different machine learning model, but trained using a different set of features.

A first plurality of machine learning models may be trained using training data associated with the first version of training and validation data. A second plurality of machine learning models may be trained using training data associated with the second version of training and validation data.

At 312, the one or more machine learning models are validated using validation data corresponding to the version of training and validation data that trained the one or more machine learning models. For example, a first machine learning model is validated using the validation data of the first version of training and validation data.

The first plurality of machine learning models may be validated using validation data associated with the first version of training and validation data. The second plurality of machine learning models may be validated using validation data associated with the second version of training and validation data.

At 314, one or more ensemble models are generated. An ensemble model may be generated based on one or more machine learning models associated with a version of training and validation data. For example, a first ensemble model may be generated based on one or more machine learning models associated with the first version of training and validation data and a second ensemble model may be generated based on one or more machine learning models associated with the second version of training and validation data.

The ensemble model is configured to output a prediction label that is based on the output of the one or more machine learning models. A weight may be assigned to each machine learning model included in the ensemble model. The weight associated with a machine learning model included in the ensemble may be tuned to reflect the degree of influence that the machine learning model has over the ensemble model prediction.

At 316, a combined ensemble model is generated. The combined ensemble model may be comprised of a plurality of ensemble models associated with different versions of training and validation data. For example, a combine ensemble model may be comprised of a first ensemble model associated with the first version of training and validation data and a second ensemble model associated with the second version of training and validation data. The combined ensemble model is configured to output a prediction label that is based on the output of the one or more version ensemble models. A weight may be assigned to each ensemble model included in the combined ensemble model. The weight associated with an ensemble model included in the combined ensemble model may be tuned to reflect the degree of influence that an ensemble model has over the combined ensemble model prediction. The predication label may indicate whether one or more entries are associated with abnormal behavior (e.g., money laundering, faulty sensor, malfunctioning device, etc.). The prediction label may indicate a probability that the entry is associated with abnormal behavior.

Figure 4:
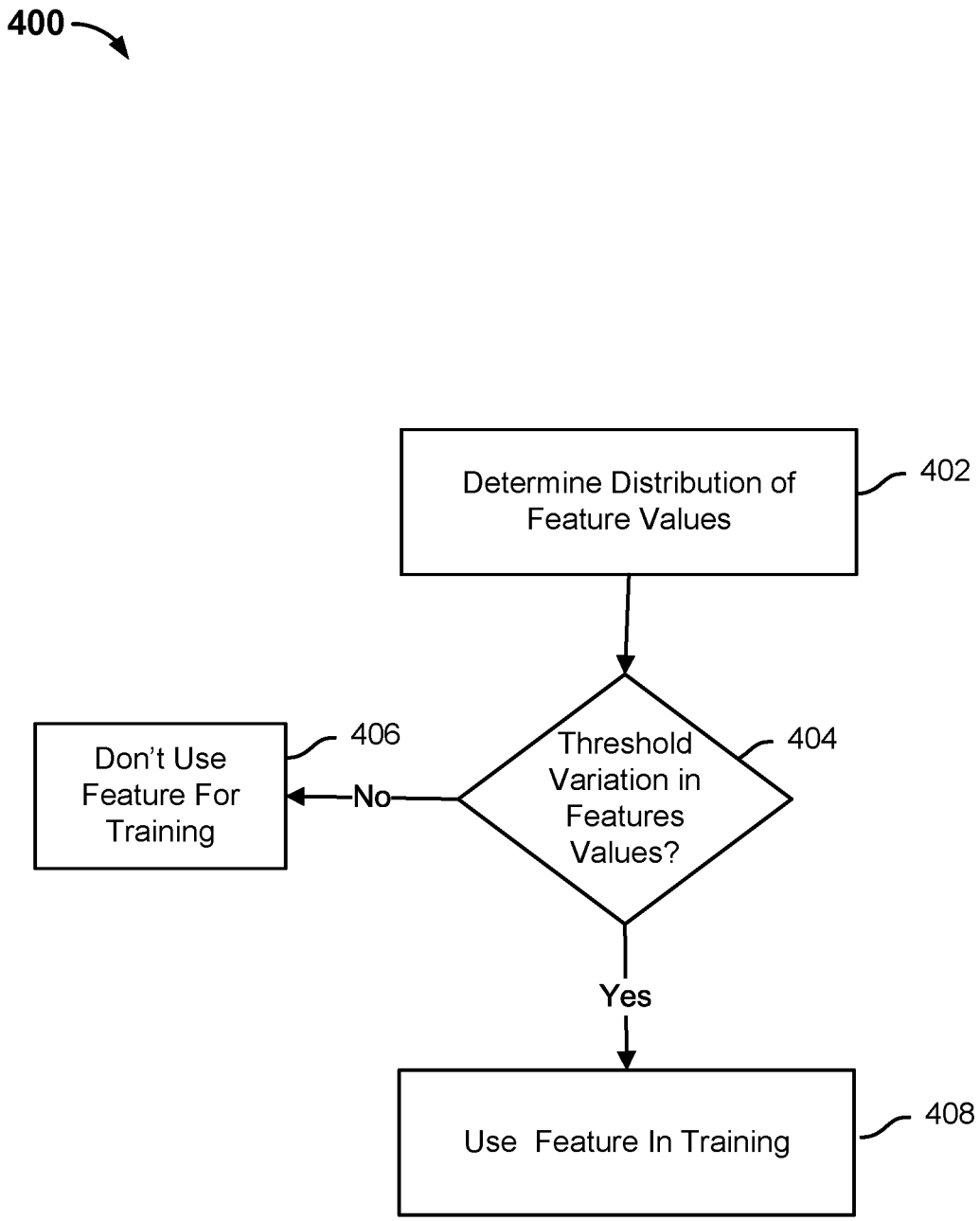
FIG. 4 is a flow chart illustrating an embodiment of a process for selecting a feature to be used in a machine learning model.

FIG. 4 is a flow chart illustrating an embodiment of a process for selecting a feature to be used in a machine learning model. Process 400 may be implemented by an abnormal behavior detection platform, such as abnormal behavior detection platform 120. Process 400 may be used to train a machine learning model and/or retrain a machine learning model. Process 400 may be used to perform some or all of 308 of process 300.

At 402, a distribution of feature values associated with a feature is determined.

At 404, it is determined whether the distribution of feature values associated with a feature satisfies a threshold variation. For example, the distribution of temperature values of a temperature sensor must have a distribution that is greater than 10 degrees for the temperature sensor to be a feature of interest. In another example, the number of times an entity deposited more than $9,000 but less than $10,000 within a specified time period must be greater than a threshold number of deposits for a feature of deposit amounts between $9000 and $10,000 to be a feature of interest.

In the event the feature values associated with the feature satisfy the threshold variation, process 400 proceeds to 408. In the event the feature values associated with the feature do not satisfy the threshold variation, process 400 proceeds to 406.

At 406, a feature is not used to train/retrain a machine learning model. This may improve the accuracy of the machine learning model because feature values associated with the feature will not negatively influence the machine learning model prediction. This may also improve the accuracy of a retrained machine learning model because a feature that was previously used to train a machine learning model may not be used to train a retrained machine learning model.

At 408, a feature is used to train/retrain a machine learning model. This may improve the accuracy of the machine learning model because features known to experience some variation may be used to detect abnormal behavior. This may also improve the accuracy of a retrained machine learning model because a feature that was not previously used to train a machine learning model may be used to retrain the machine learning model. After the machine learning model is trained, a feature not included in the subset of features that are used to train the machine learning model may exhibit volatile behavior and influence the prediction for which the machine learning model is trained to predict. The machine learning model would be unable to determine the influence of the feature in its prediction unless it is retrained.

Figure 5:
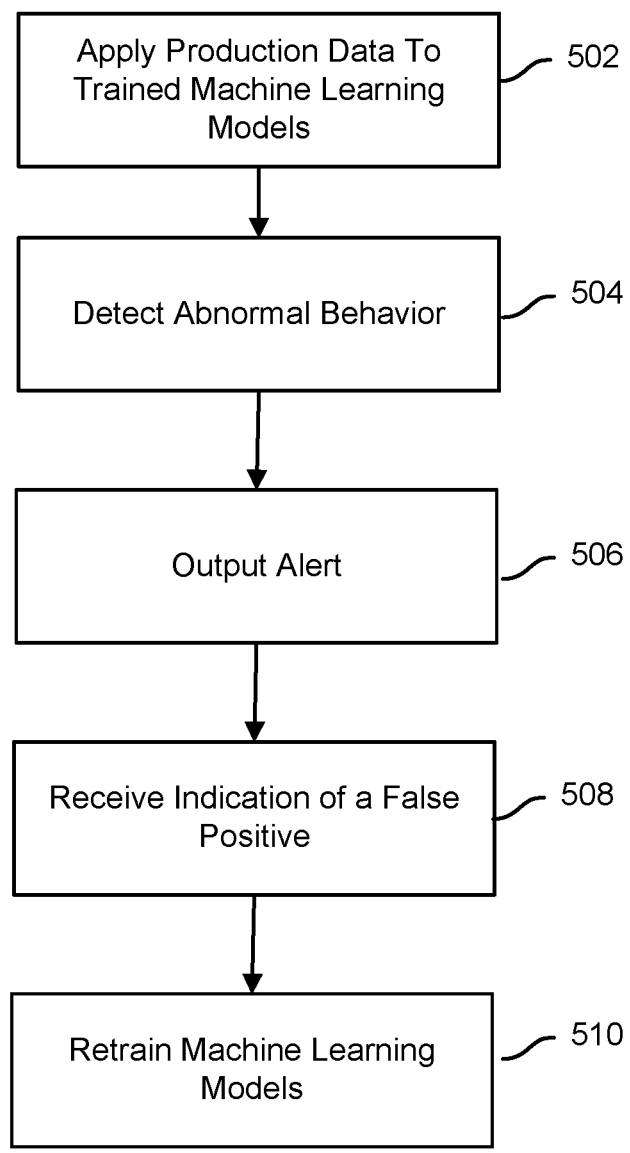
FIG. 5 is a flow chart illustrating an embodiment of a process for predicting abnormal behavior.

FIG. 5 is a flow chart illustrating an embodiment of a process for predicting abnormal behavior. Process 500 may be implemented by an abnormal behavior detection platform, such as abnormal behavior detection platform 120.

At 502, production data is applied to the machine learning models. Production data includes one or more entries that associated with a plurality of features having corresponding feature values. Production data does not include corresponding predictions labels.

At 504, abnormal behavior is detected. The output of the one or more machine learning models associated with a corresponding version of training and validation data is combined to generate an ensemble model prediction. A weight may be assigned to each machine learning model included in the ensemble model. The weight associated with a machine learning model included in the ensemble may be tuned to reflect the degree of influence that the machine learning model has over the ensemble model prediction.

The corresponding ensemble models may be combined to generate a combined ensemble model. The combined ensemble model may be configured to output a prediction label for each of the one or more entries. The prediction label may indicate a probability that the entry is associated with abnormal behavior (e.g., money laundering, faulty sensor, malfunctioning device, etc.). In some embodiments, the combined ensemble model is configured to indicate that a single entry is indicative of abnormal behavior. In other embodiments, the combined ensemble model is configured to indicate a subset of the one or more entries is indicative of abnormal behavior.

At 506, an alert is outputted. The one or more entries that are indicative of abnormal behavior are identified (e.g., flagged) and a notification is provided to a reviewer system to review the identified one or more entries.

At 508, an indication of one or more false positives is received. A user of the reviewer system may indicate that an entry is a true positive or a false positive. A true positive is an entry that was identified as being indicative of abnormal behavior and is indicative of abnormal behavior. A false positive is an entry that was identified as being indicative of abnormal behavior and is not indicative of abnormal behavior.

At 510, the one or more machine learning models are retrained. In the event a threshold number of false positives are received, the one or more machine learning models are retrained. In some embodiments, the one or more machine learning models are periodically retrained.

Figure 6:
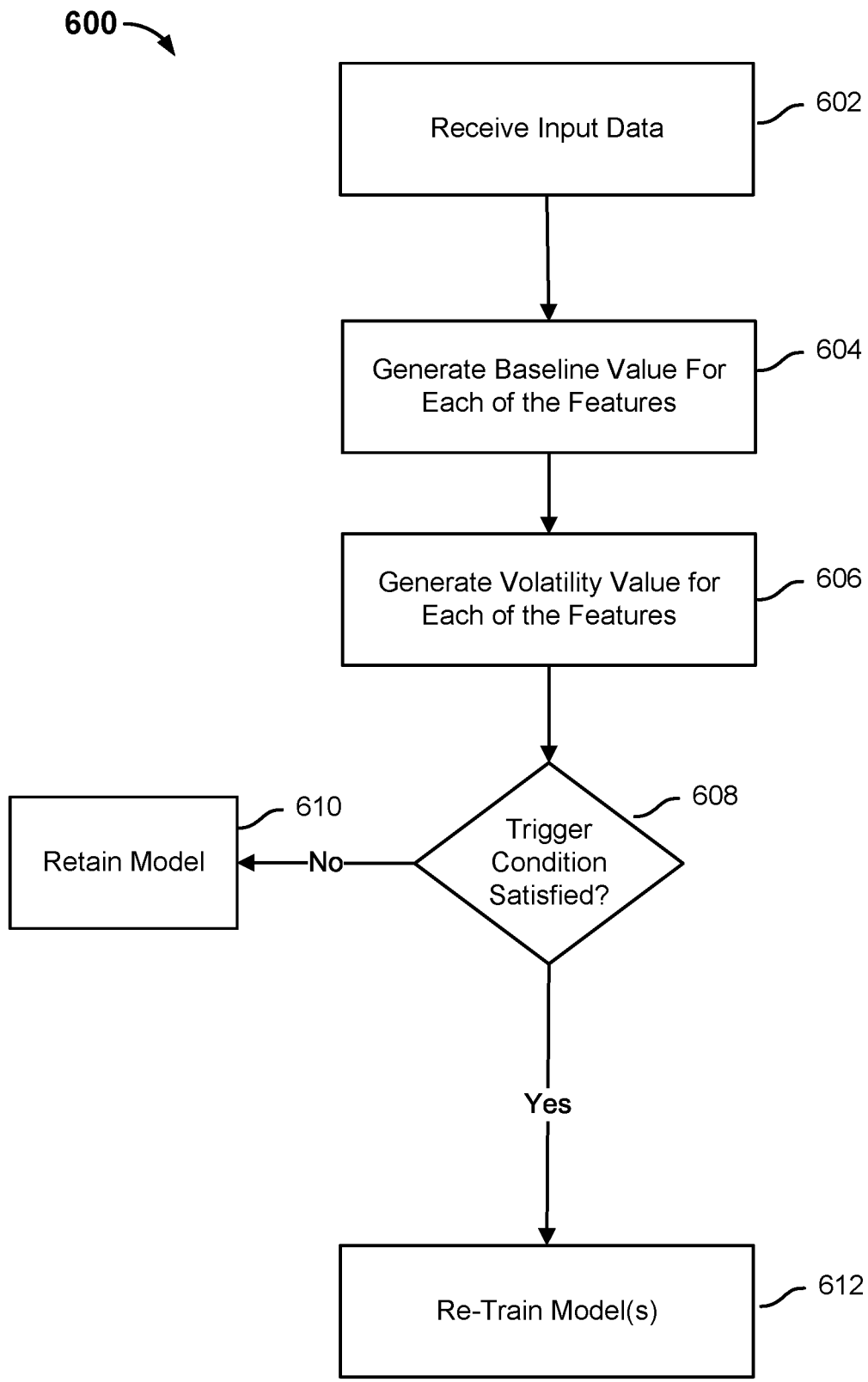
FIG. 6 is a flow chart illustrating an embodiment of a process for retraining the machine learning models based on feature volatility.

FIG. 6 is a flow chart illustrating an embodiment of a process for retraining the machine learning models based on feature volatility. Process 600 may be implemented by an abnormal behavior detection platform, such as abnormal behavior detection platform 120.

At 602, an input dataset is received. Input data may be received on a periodic basis (e.g., daily). The set of input data is comprised of a plurality of entries. Each entry is associated with a plurality of features having corresponding feature values. The input dataset may be combined with one or more previously received input datasets to generate an accumulated dataset.

At 604, a baseline value is generated for each of the features included in the accumulated dataset. The baseline value may be generated for a specified time period. The specified time period may be a previous time period (e.g., last hour, last day, last week, last month, last six months, last year, etc.) or a specific time period (e.g., 1/1/2018, 1/1/2018-1/14/2018, 9:00 am EST 1/1/2018-10:00 am EST 1/1/2018, etc.). The baseline value for a feature may correspond to a statistical value associated with the feature (e.g., average, mean, range, etc.).

At 606, a volatility value is generated for each of the features included in the accumulated dataset. The volatility value may be generated for a specified time period. The specified time period may be a previous time period (e.g., last hour, last day, last week, last 2 weeks, etc.) or a specific time period (1/1/2017, 1/1/2017-1/14/2017, etc.). The specified time period associated with the volatility value of a feature is a time period that is shorter in duration than the specified time period associated with the baseline value of the feature. The volatility value for a feature may correspond to a statistical value associated with the feature (e.g., average, mean, range, etc.).

At 608, it is determined whether a trigger condition has been satisfied. The statistical baseline value of a feature is compared to the statistical volatility value of the feature. In the event the statistical volatility value does not satisfy a trigger condition (e.g., a threshold) when compared to the statistical baseline value for any of the features, process 600 proceeds to 610 and the one or more machine learning models associated with the combined ensemble model are retained. In the event the statistical volatility value satisfies a trigger condition when compared to the statistical baseline value for any of the features, process 600 proceeds to 612 and at least one of the one or more machine learning models of the combined ensemble model is retrained. For example, the statistical baseline value of a feature may be the median value of the feature for the last 6 months and the statistical volatility value of the feature may be the average value of the feature for the last 2 weeks. In the event the statistical volatility value of the feature varies from the statistical baseline value of a feature more than a threshold amount (e.g., one standard deviation), a machine learning model may be retrained. For example, in the event a machine learning model was not trained using the volatile feature, the machine learning model may be retrained based at least in part on the volatile feature. In the event a machine learning model was trained using the volatile feature, the machine learning model may be retrained such that a weight associated with the volatile feature is tuned to take the volatility into account. This may improve the accuracy of a retrained machine learning model because a feature that was not previously used to train a machine learning model may be used to retrain the machine learning model.

In some embodiments, the one or more machine learning models are periodically retrained (e.g., every 10 days, every 20 days, every 30 days, etc.) In the event the satisfaction of a trigger condition occurs, a clock associated with the periodic retraining is reset. For example, the one or more machine learning models may be retrained every 30 days. On day 28 of the 30 day period, it may be determined that the one or more machine learning models are to be retrained. After the one or more machine learning models are retrained, the clock associated with the periodic retraining is reset and the one or more machine learning models are schedule to be retrained 30 days from the retraining day instead of at the end of the previous 30 day period.

Figure 7:
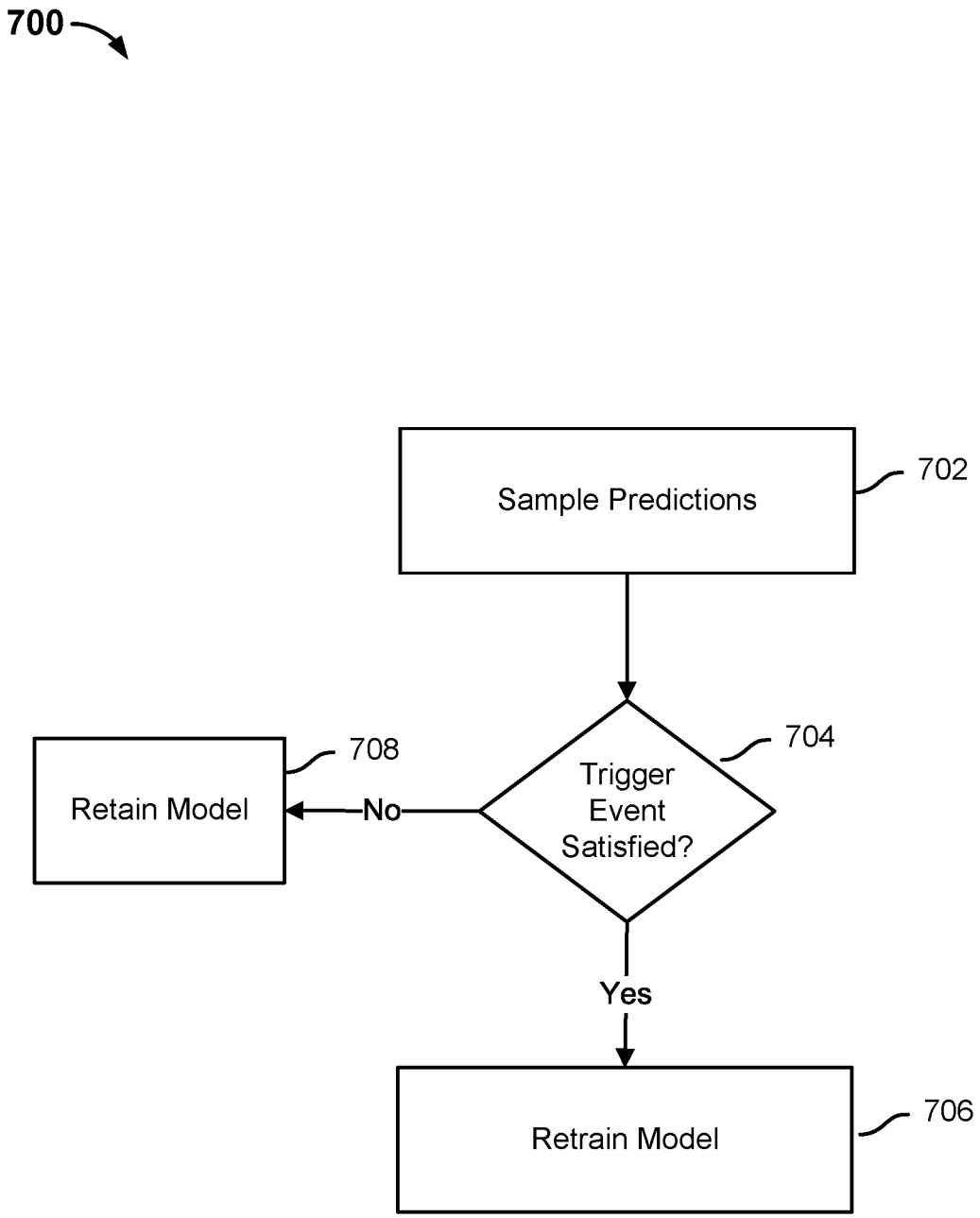
FIG. 7 is a flow chart illustrating an embodiment of a process for monitoring a machine learning model.

FIG. 7 is a flow chart illustrating an embodiment of a process for monitoring a machine learning model. Process 700 may be implemented by an abnormal behavior detection platform, such as abnormal behavior detection platform 120.

At 702, a subset of the predictions are sampled. An abnormal behavior detection platform may output a plurality of predictions. For example, an abnormal behavior detection platform may output 1000 predictions. 10 of the predictions may be sampled.

At 704, it is determined whether any of the sampled outputs satisfy a trigger event. A trigger event may indicate that threshold number of false positives have been predicted. A reviewer of the predictions may provide an indication regarding whether a prediction is a false positive or a true positive. In the event a trigger event is satisfied, process 700 proceeds to 706 and at least one of the machine learning models is retrained. In the event the satisfaction of a trigger condition occurs, a clock associated with the periodic retraining is reset. For example, the one or more machine learning models may be retrained every 30 days. On day 28 of the 30 day period, it may be determined that the one or more machine learning models are to be retrained. After the one or more machine learning models are retrained, the clock associated with the periodic retraining is reset and the one or more machine learning models are schedule to be retrained 30 days from the retraining day instead of at the end of the previous 30 day period. In the event a trigger event is not satisfied, process 700 proceeds to 708 and the one or more machine learning models are retained.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
sort an input dataset into a first version of data and a second version of data, wherein the input dataset is associated with a plurality of features, wherein the first version of data is associated with a first period of time and the second version of data is associated with a second period of time, wherein the second period of time is a shorter period of time than the first period of time;
based on whether feature values associated with the plurality of features satisfy a threshold variation, filter one or more features from the plurality of features to generate a subset of training features, wherein the training features included in the subset satisfy the threshold variation, wherein a first feature of the one or more features filtered from the plurality of features was previously used to train a machine learning model included in a combined ensemble model;
generate a first set of one or more machine learning models based on the first version of data;
generate a second set of one or more machine learning models based on the second version of data;
combine the first set of one or more machine learning models and the second set of one or more machine learning models to generate a combined ensemble model, comprising to:
weigh the first set of one or more machine learning models by a first weight to obtain a first weighted set of one or more machine learning models;
weigh the second set of one or more machine learning models by a second weight to obtain a second weighted set of one or more machine learning models, wherein the first weight is different from the second weight; and
combine the first weighted set of one or more machine learning models and the second weighted set of one or more machine learning models to obtain the combined ensemble model;
output a prediction based on the combined ensemble model, wherein the prediction indicates abnormal behavior associated with the input dataset;
determine a baseline value for a feature;
determine a volatility value for the feature; and
retrain at least one machine learning model based at least in part on the determined baseline value and the determined volatility value, wherein the retraining includes tuning the first weight to relate to a first degree of influence that the first set has over the combined ensemble model and the second weight to relate to a second degree of influence that the second set has over the combined ensemble model; and a memory coupled to the processor and configured to provide the processor with instructions.

2. The system of claim 1, wherein the processor is further configured to receive the input dataset.

3. The system of claim 2, wherein the input dataset is comprised of a plurality of entries.

4. The system of claim 3, wherein the plurality of entries are associated with the plurality of features and corresponding feature values.

5. The system of claim 4, wherein the processor is further configured to generate one or more new features based at least in part on the plurality of features.

6. The system of claim 5, wherein the processor is further configured to generate at least one machine learning model based at least in part on the one or more new features.

7. The system of claim 1, wherein the combined ensemble model is configured to output one or more predictions.

8. The system of claim 1, wherein the processor is further configured to:
determine a distribution of feature values associated with a feature;
select the feature based at least in part on the distribution of feature values; and
train a machine learning model based at least in part on the selected feature.

9. The system of claim 1, wherein the processor is further configured to apply production data to the first set of one or more machine learning models and the second set of one or more machine learning models.

10. The system of claim 1, wherein the processor is further configured to:
receive an indication of one or more false positives; and
retrain at least one machine learning model based at least in part on the indication.

11. The system of claim 1, wherein the processor is further configured to:
sample a subset of one or more predictions associated with the combined ensemble model;
determine whether a trigger event is satisfied; and
retrain at least one machine learning model based on the determination.

12. The system of claim 1, wherein the first set of one or more machine learning models and/or the second set of one or more machine learning models are periodically trained.

13. A method, comprising:
sorting an input dataset into a first version of data and a second version of data, wherein the input dataset is associated with a plurality of features, wherein the first version of data is associated with a first period of time and the second version of data is associated with a second period of time, wherein the second period of time is a shorter period of time than the first period of time;
based on whether feature values associated with the plurality of features satisfy a threshold variation, filtering one or more features from the plurality of features to generate a subset of training features, wherein the training features included in the subset satisfy the threshold variation, wherein a first feature of the one or more features filtered from the plurality of features was previously used to train a machine learning model included in a combined ensemble model;
generating a first set of one or more machine learning models based on the first version of data and the subset of training features;
generating a second set of one or more machine learning models based on the second version of data and the subset of training features;
combining the first set of one or more machine learning models and the second set of one or more machine learning models to generate the combined ensemble model, comprising:
weighing the first set of one or more machine learning models by a first weight to obtain a first weighted set of one or more machine learning models;
weighing the second set of one or more machine learning models by a second weight to obtain a second weighted set of one or more machine learning models, wherein the first weight is different from the second weight; and
combining the first weighted set of one or more machine learning models and the second weighted set of one or more machine learning models to obtain the combined ensemble model;
outputting a prediction based on the combined ensemble model, wherein the prediction indicates abnormal behavior associated with the input dataset;
determining a baseline value for a feature;
determining a volatility value for the feature; and
retraining at least one machine learning model based at least in part on the determined baseline value and the determined volatility value, wherein the retraining includes tuning the first weight to relate to a first degree of influence that the first set has over the combined ensemble model and the second weight to relate to a second degree of influence that the second set has over the combined ensemble model.

14. The method of claim 13, further comprising:
receiving an indication of one or more false positives; and
retraining at least one machine learning model based at least in part on the indication.

15. The method of claim 13, further comprising:
determining a baseline value for a feature;
determining a volatility value for the feature; and
retraining at least one machine learning model based at least in part on the determined baseline value and the determined volatility value.

16. The method of claim 13, further comprising:
sampling a subset of the one or more predictions;
determining whether a trigger event is satisfied; and
retraining at least one machine learning model based on the determination.

17. The method of claim 13, further comprising receiving the input dataset, wherein the input data is comprised of a plurality of entries, wherein the plurality of entries are associated with a plurality of features and corresponding feature values.

18. The method of claim 17, further comprising generating one or more new features based at least in part on the plurality of features.

19. A non-transitory computer readable storage medium having computer program product embodied therein comprising computer instructions for:
sorting an input dataset into a first version of data and a second version of data, wherein the input dataset is associated with a plurality of features, wherein the first version of data is associated with a first period of time and the second version of data is associated with a second period of time, wherein the second period of time is a shorter period of time than the first period of time;

based on whether feature values associated with the plurality of features satisfy a threshold variation, filtering one or more features from the plurality of features to generate a subset of training features, wherein the training features included in the subset satisfy the threshold variation, wherein a first feature of the one or more features filtered from the plurality of features was previously used to train a machine learning model included in a combined ensemble model;

generating a first set of one or more machine learning models based on the first version of data and the subset of training features;

generating a second set of one or more machine learning models based on the second version of data and the subset of training features;

combining the first set of one or more machine learning models and the second set of one or more machine learning models to generate the combined ensemble model, comprising:

weighing the first set of one or more machine learning models by a first weight to obtain a first weighted set of one or more machine learning models;

weighing the second set of one or more machine learning models by a second weight to obtain a second weighted set of one or more machine learning models, wherein the first weight is different from the second weight; and combining the first weighted set of one or more machine learning models and the second weighted set of one or more machine learning models to obtain the combined ensemble model;

outputting a prediction based on the combined ensemble model, wherein the prediction indicates indicate abnormal behavior associated with the input dataset;

determining a baseline value for a feature;

determining a volatility value for the feature; and retraining at least one machine learning model based at least in part on the determined baseline value and the determined volatility value, wherein the retraining includes tuning the first weight to relate to a first degree of influence that the first set has over the combined ensemble model and the second weight to relate to a second degree of influence that the second set has over the combined ensemble model.

* * * * *